US006726178B2

(12) United States Patent
Grandage

(10) Patent No.: US 6,726,178 B2
(45) Date of Patent: Apr. 27, 2004

(54) GATE VALVES

(75) Inventor: Ronald E. Grandage, Brighouse (GB)

(73) Assignee: Aeon Pipe Systems Holdings Limited, Guilford (GB)

( * ) Notice: Subject to any disclaimer, the term of this patent is extended or adjusted under 35 U.S.C. 154(b) by 0 days.

(21) Appl. No.: 10/341,605

(22) Filed: Jan. 14, 2003

(65) Prior Publication Data

US 2003/0155545 A1 Aug. 21, 2003

(51) Int. Cl.⁷ .................................................. F16K 3/12
(52) U.S. Cl. ........................................................ 251/327
(58) Field of Search ................................ 251/326–329

(56) References Cited

U.S. PATENT DOCUMENTS

| | | | | |
|---|---|---|---|---|
| 181,267 A | * | 8/1876 | Jenkins | 251/327 |
| 2,815,187 A | * | 12/1957 | Hamer | 251/327 |
| 3,111,137 A | * | 11/1963 | Carlin | 251/327 |
| 3,412,973 A | * | 11/1968 | Carr et al. | 251/327 |
| 4,573,660 A | * | 3/1986 | Husted | 251/327 |
| 4,592,534 A | * | 6/1986 | Ueda et al. | 251/327 |
| 4,607,821 A | * | 8/1986 | David | 251/329 |
| 6,116,572 A | * | 9/2000 | Schlattmann et al. | 251/327 |

FOREIGN PATENT DOCUMENTS

AU     20441     * 3/1972     ................. 251/327

* cited by examiner

Primary Examiner—Paul J. Hirsch
(74) Attorney, Agent, or Firm—Nixon & Vanderhye

(57) ABSTRACT

The invention provides a gate valve comprising a wedge-shaped gate 10 movable into a passageway 11 to seal the passageway, the wedge-shaped gate having first and second sides 13, 14 and a butt region 24, the first and second sides converging towards the butt region, the first side having a perimeter seal 20 facing upstream, the second side having a perimeter seal 21 facing downstream, each perimeter seal merging into a butt end seal 22, 23 for sealing against a face of the passageway, opposed to the butt end, there thus being two butt seals 22, 23 spaced apart with respect to the axis of the passageway, the wedge-shaped gate 10 having a concavity 18, 19 within each perimeter seal to reduce the weight of the gate, the seals being coated with resilient material and the geometry of the valve being such that although the butt end seals 22, 23 undergo a substantially greater degree of compression than the perimeter seals, for a given movement of the gate, the final degree of compression of all the seals, when the valve is finally closed, is substantially similar.

2 Claims, 4 Drawing Sheets

GATE VALVES

The invention relates to gate valves.

The invention provides a gate valve comprising a wedge shaped gate movable into a passageway to seal the passageway, the wedge shaped gate having first and second sides and a butt region, the first and second sides converging towards the butt region, the first side having a perimeter seal facing upstream, the second side having a perimeter seal facing downstream, each perimeter seal merging into a butt end seal for sealing against a face of the passageway opposed to the butt end, there thus being two butt seals spaced apart with respect to the axis of the passageway, the wedge shaped gate having a concavity within each perimeter seal to reduce the weight of the gate, the seals being coated with resilient material and the geometry of the valve being such that although the butt end seals undergo a substantially greater degree of compression than the perimeter seals, for a given movement of the gate, the final degree of compression of all the seals, when the valve is finally closed, is-substantially similar.

There may be a bore through the gate, perpendicular to the axis of the passageway, to accommodate a spindle for operating the valve, the bore having an exit hole in the butt end of the gate, positioned between the spaced apart butt end seals.

By way of example, a specific embodiment of the invention will now be described, with reference to the accompanying drawings.

Figure 1:
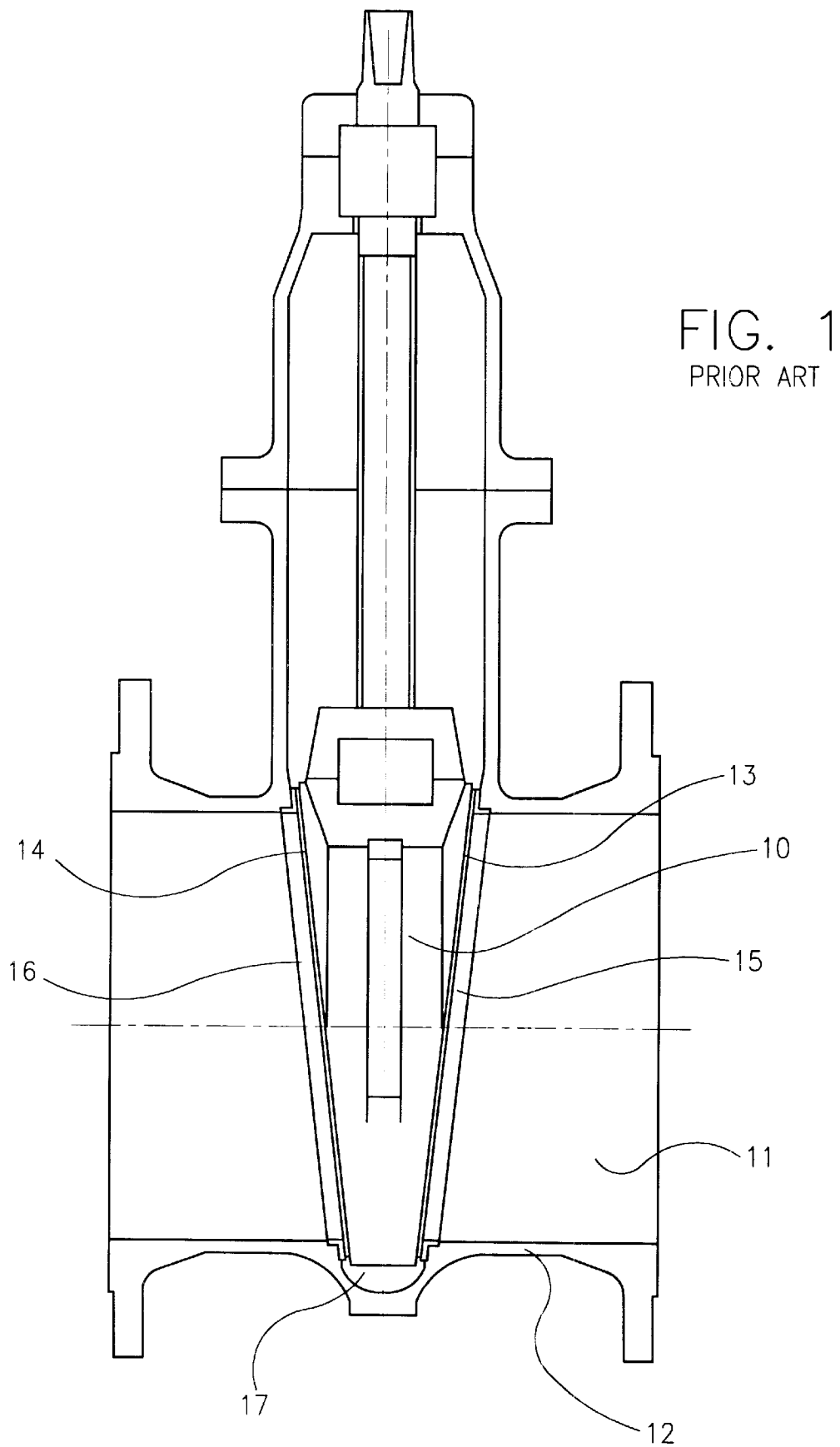
FIG. 1 is a cross-sectional view through a prior art gate valve looking perpendicular to the axis of a passageway.

FIG. 1 illustrates a conventional valve in which a wedge shaped gate 10 is movable to seal a passageway 11 in a pipe section 12.

Each of the converging faces 13, 14 of the gate is a flat face arranged to seal against a respective sealing ring 15, 16 let into the pipe section 12. To enable the rings 15 and 16 to be accommodated, and to enable the gate 10 to travel sufficiently to provide a firm seal, a cavity 17 must be provided in the pipe section 12. Over time debris can collect In this cavity which eventually prevents the gate 10 from moving into apposition In which a satisfactory seal can be made.

Figure 2:
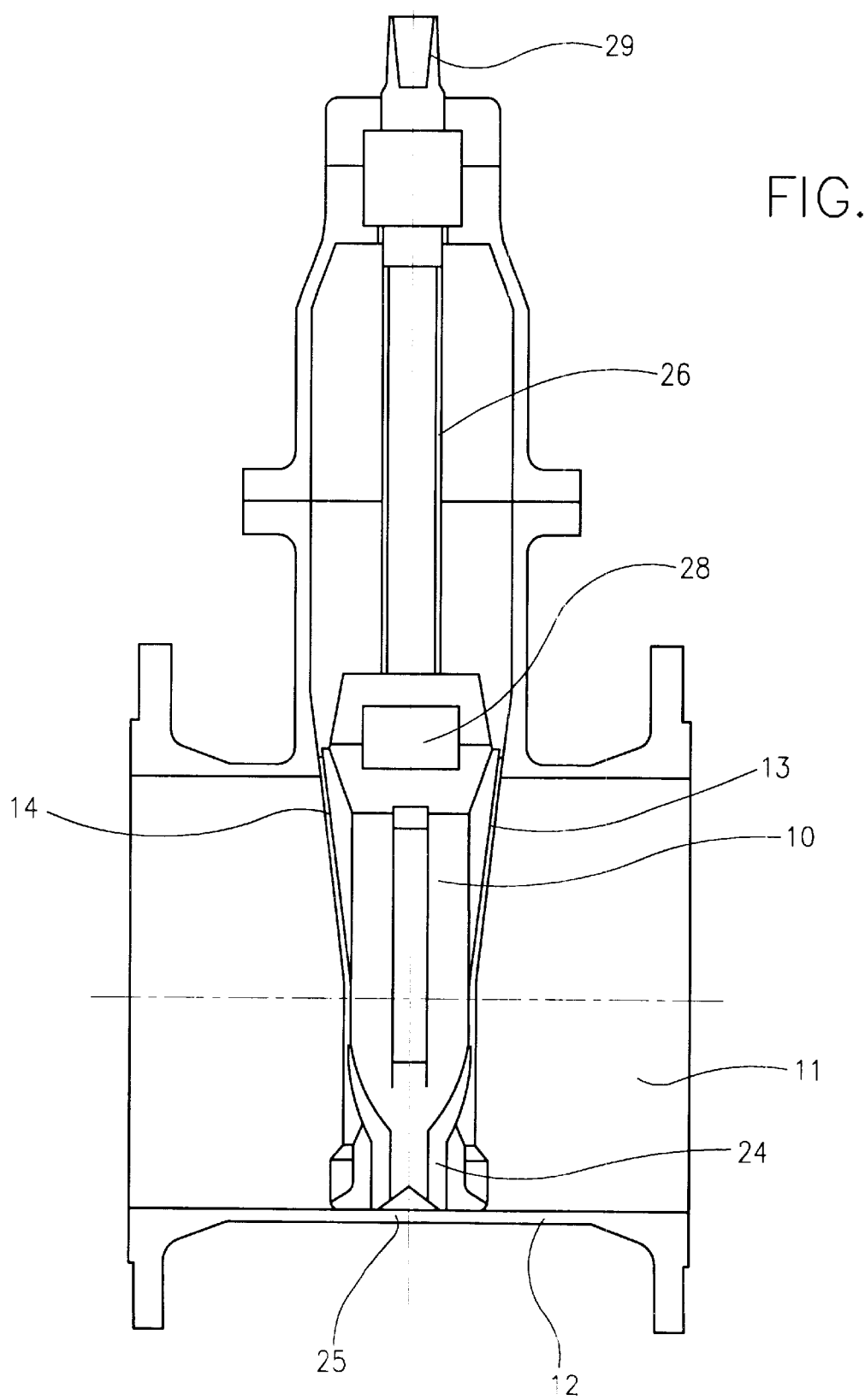
FIG. 2 is a similar view showing an embodiment of gate valve according to the invention.

The valve according to this embodiment of the invention, as shown in FIG. 2, has some similarities to the valve shown in FIG. 1, and similar components are referred to by reference numerals similar to those used above.

However, there are some significant differences which avoid the collection of any debris, and provide more efficient sealing, although less torque is required to move the gate into its sealing position.

The gate of the valve shown in FIG. 2 does have converging side faces 13 and 14 but they are not flat. Respective concavities 18, 19 are provided in each face so that the relevant side seal is a perimeter seal 20, 21. These concavities reduce the weight of the gate and the amount of material required to construct the gate, but also improve the sealing characteristic of the side faces.

Each side seal 20, 21, merges into a respective butt end seal 22, 23 at the butt end 24 of the gate.

Thus, there are two spaced apart butt end seals which seal against an opposed face 25 of the passageway 11. These spaced apart seals can clearly be seen in FIG. 2.

Since there is no cavity within the passage 11, it is unlikely that any debris will collect. Any debris will be swept through the pipe section 12 by fluid flowing through the valve.

All surfaces of the gate are coated with an elastomeric material and even if some debris should be trapped, during final closing of the valve, between the elastomeric face of one of the butt end seals, and the surface 25, then effective sealing should be carried out by the other butt end seal.

Figure 5:
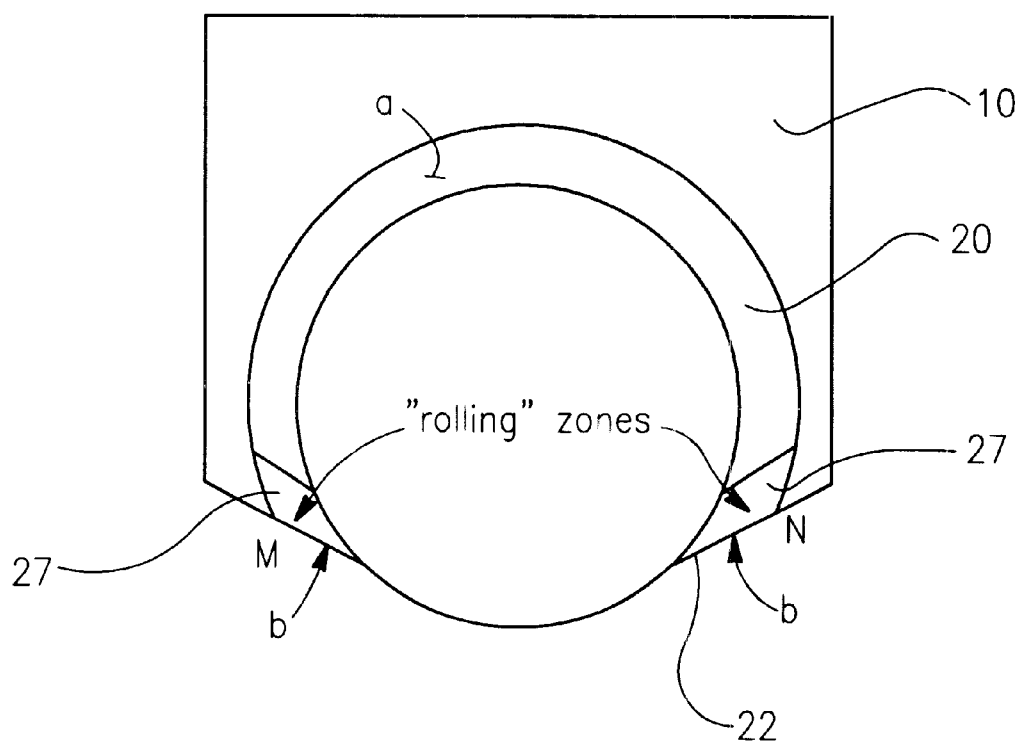
FIG. 5 is a view similar to FIG. 4, but in diagrammatic form to illustrate one of the principles of this novel embodiment of gate valve.

The diagram shown in FIG. 5 illustrates how the seal 20 rolls round to merge smoothly with the respective butt end seal 22. The seal rolls from the generally axial perimeter face a which extends from M to N around the top end of the wedge to its generally radial face b which extends from M to N around the bottom of the wedge.

This geometry can be selected so that when the valve reaches its closed position, the degree of compression of the elastomeric material is substantially the same for the perimeter seals and the butt end seals, even though one increment of movement of the gate clearly brings about a much greater degree of compression of the butt end seal than the perimeter seals. For example, if the slope of the converging faces is 1 in 10, 1 mm of movement of the gate will bring about 1 mm of compression of the butt end seals but only 0.1 mm compression of the perimeter seals.

The geometry shown in the figures minimises the vertical force which must be applied to the wedge to produce an efficient sealing compression and hence this minimises the torque that must be applied to the operating spindle 26 of the valve.

The rolling zones 27, shown in FIG. 5, also have the advantage that they avoid sharp changes in direction in the elastomeric material, which may comprise rubber, thereby reducing the possibility of bunching or stretching of the rubber. Such bunching or stretching can occur when rubber is compressed in a zone where there is a sharp change of direction. This in turn leads to uneven compression of the rubber seal which can cause premature wear or rupture, and can increase the torque required to operate the valve, The rolling zone may achieve its purpose by following, for example, the surface of an inclined cone, cylinder or other smooth tapered or parallel prismatic surface.

With prior art valves, the transition zone between side seals and the usual single butt seal tend to result in a T-junction, the transition zone forming a cross bar of the T and the seal running down to the butt end of the wedge forming the stem of the T. Thus there is an area immediately below the T-junction where there is only one seal between the upstream and downstream sides of the valve Other known configurations also have a zone where there is only one seal between the upstream and downstream sides of the valve.

The gate is moved by rotating the threaded shaft 26. Within the upper end of the gate 10 there is a captive nut 28 so rotation of the shaft 26, for example by means of a hand wheel (not shown) fitted to the top 29 of the shaft, will cause the nut 28 and hence the gate 10 to ride up and down the shaft.

To reduce the height of the gate, the shaft 26 is permitted to pass right through the gate, when the gate is in its raised position. This results in a vertical bore through the gate, terminating In the hole 30 shown in FIG. 3. This hole 30 also ensures that fluid can drain out of the gate when it is removed, for example for replacement or repair, reducing the risk that corrosion will commence within the gate.

Figure 3:
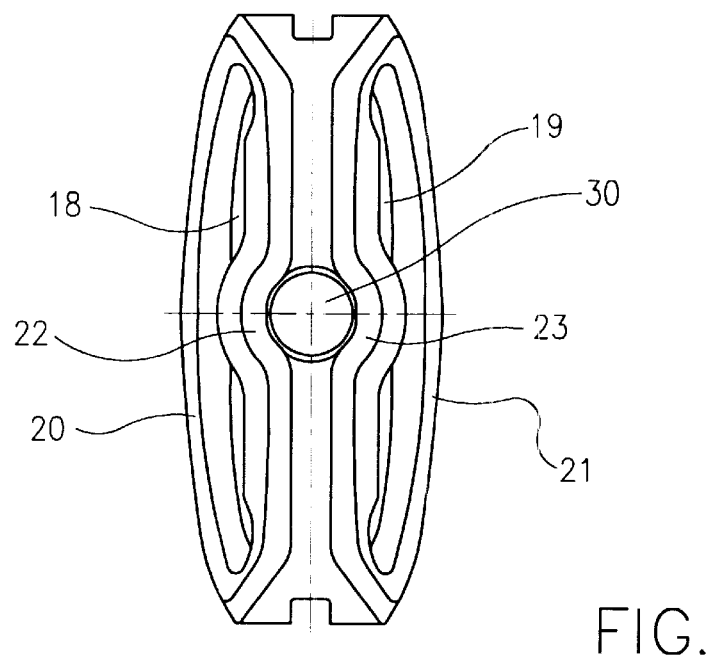
FIG. 3 is an under plan view of the gate of the valve shown in FIG. 2.
Figure 4:
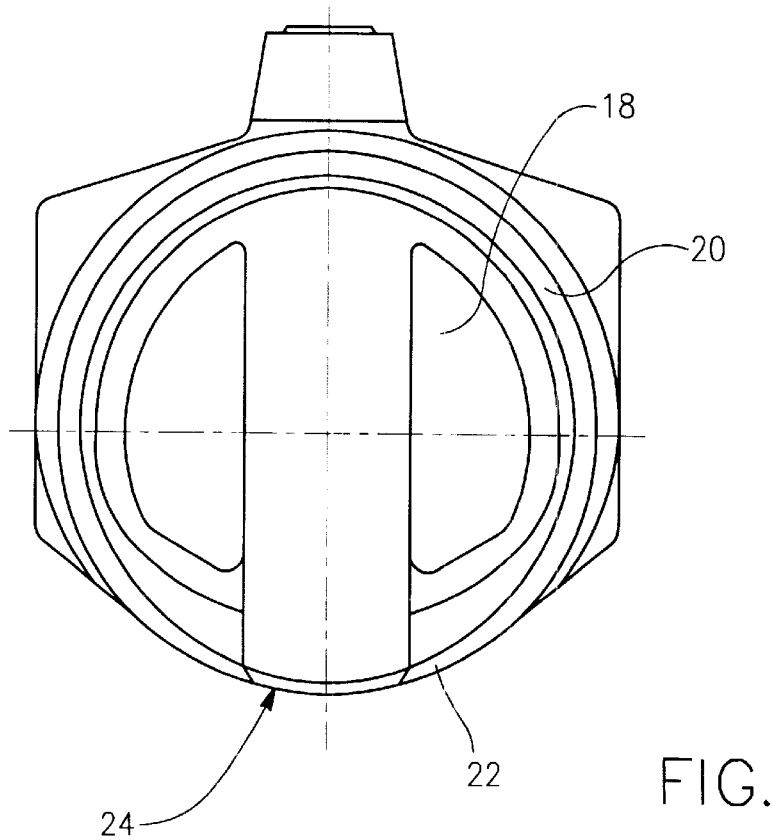
FIG. 4 is a view of the gate of the valve of FIG. 2, looking in the direction of the axis of the passageway.

It will be particularly seen from FIG. 3 that the hole 30 lies between the spaced apart butt end seals 22 and 23

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined In any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A gate valve comprising a wedge shaped gate movable into a passageway to seal the passageway, the wedge shaped gate having first and second sides and a butt region, the first and second sides converging towards the butt region, the first side having a perimeter seal facing upstream, the second side having a perimeter seal facing downstream, each perimeter seal merging into a butt end seal for sealing against a face of the passageway opposed to the butt end, there thus being two butt seals spaced apart with respect to the axis of the passageway, the wedge shaped gate having a concavity within each perimeter seal to reduce the weight of the gate, the seals being coated with resilient material and the geometry of the valve being such that although the butt end seals undergo a substantially greater degree of compression than the perimeter seals, for a given movement of the gate, the final degree of compression of all the seals, when the valve is finally closed, is substantially similar.

2. A gate valve as claimed in claim 1, in which there is a bore through the gate, perpendicular to the axis of the passageway, to accommodate a spindle for operating the valve, the bore having an exit hole in the butt end of the gate, positioned between the spaced apart butt end seals.

* * * * *